(12) United States Patent
Langlais et al.

(10) Patent No.: US 8,565,966 B2
(45) Date of Patent: Oct. 22, 2013

(54) PORTABLE TRUCK TESTER

(75) Inventors: Kenneth L. Langlais, Andover, MA (US); Robert R. Trottier, Andover, MA (US); Daniel Maguire, Burlington, MA (US)

(73) Assignee: Scully Signal Company, Wilmington, MA (US)

( * ) Notice: Subject to any disclaimer, the term of this patent is extended or adjusted under 35 U.S.C. 154(b) by 51 days.

(21) Appl. No.: 13/427,502

(22) Filed: Mar. 22, 2012

(65) Prior Publication Data

US 2012/0245792 A1 Sep. 27, 2012

Related U.S. Application Data

(60) Provisional application No. 61/466,689, filed on Mar. 23, 2011.

(51) Int. Cl.
*G06F 19/00* (2011.01)

(52) U.S. Cl.
USPC ........................................................ 701/34.3

(58) Field of Classification Search
USPC ............ 701/34.3, 34.4; 340/532, 538, 539.11
See application file for complete search history.

(56) References Cited

U.S. PATENT DOCUMENTS

| | | | |
|---|---|---|---|
| 3,503,020 A | 3/1970 | Blain | |
| 5,411,324 A | 5/1995 | Zydek et al. | |
| 5,605,182 A | 2/1997 | Oberrecht et al. | |
| 6,261,130 B1 | 7/2001 | Huynh et al. | |
| 7,070,458 B2 | 7/2006 | Axenböck et al. | |
| 8,051,882 B2 | 11/2011 | Koeninger et al. | |
| 2006/0095175 A1 | 5/2006 | deWaal et al. | |
| 2010/0089486 A1 | 4/2010 | Koeninger et al. | |
| 2012/0044068 A1* | 2/2012 | Koeninger et al. | 340/539.11 |

* cited by examiner

*Primary Examiner* — Mary Cheung
(74) *Attorney, Agent, or Firm* — Preti Flaherty Beliveau & Pachios LLP

(57) ABSTRACT

A hand held portable truck safety equipment tester uses loading rack criteria to confirm proper operation of the truck but is contained in a small portable battery operated unit. This unit allows for correlation to a rack controller's test and includes direct readout via an LED screen showing the error condition. Additionally, the tester has the capability to test all types of trucks without the need for adapters to accommodate different connectors and allows for remote diagnostics. The tester automatically determines which type of sensor and what grounding system is used.

24 Claims, 16 Drawing Sheets

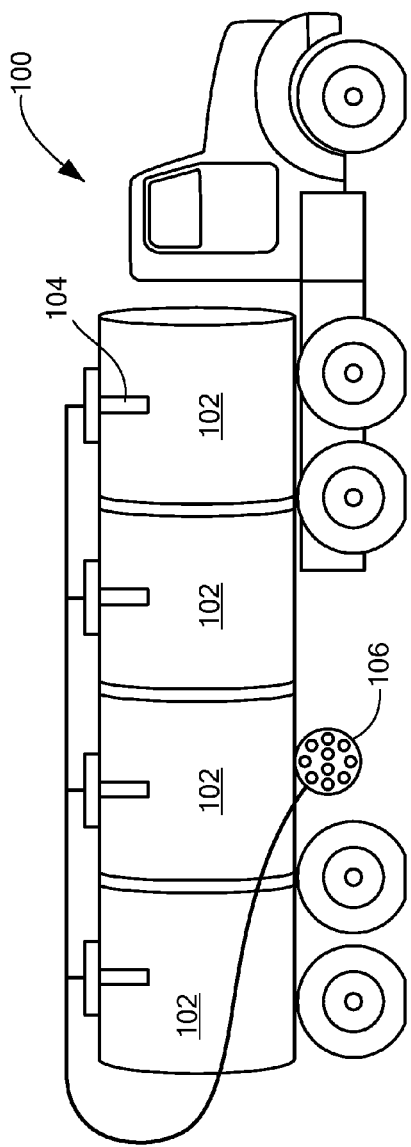
*FIG. 1*
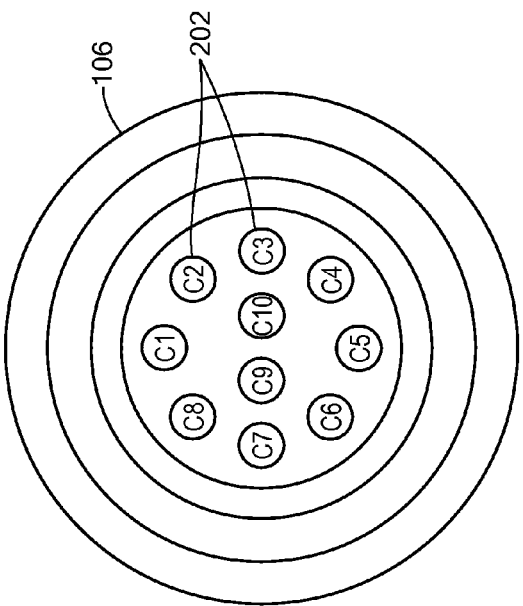
*FIG. 2*
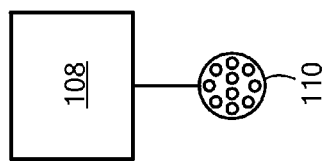

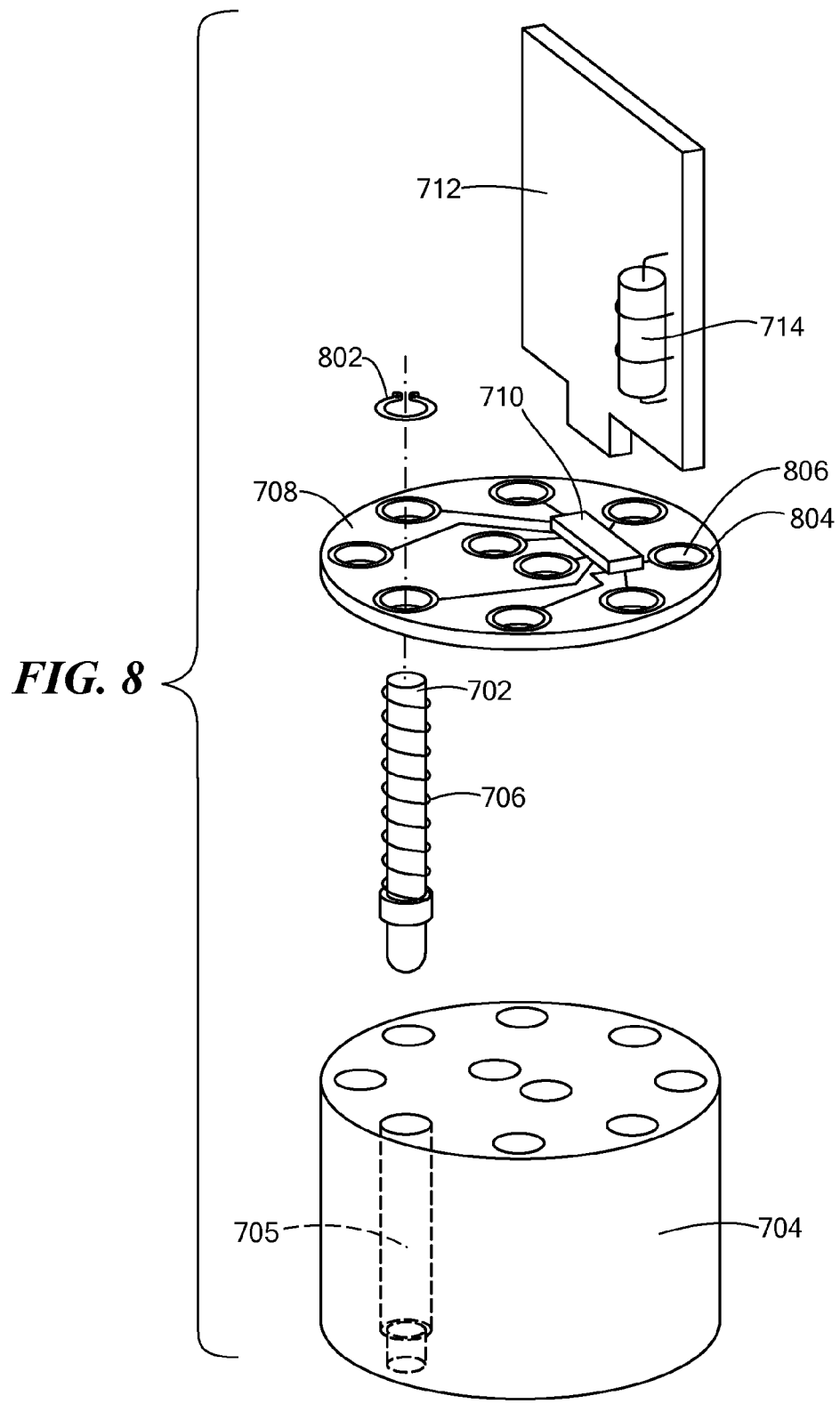

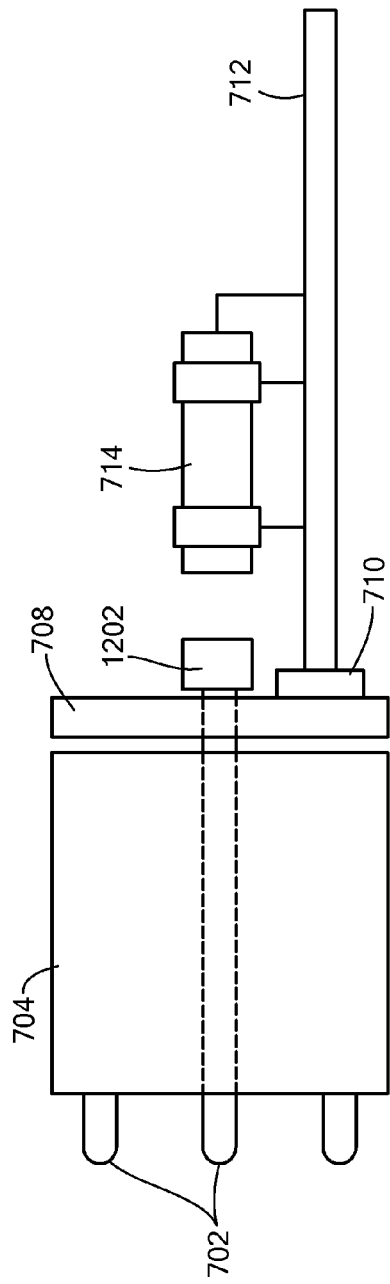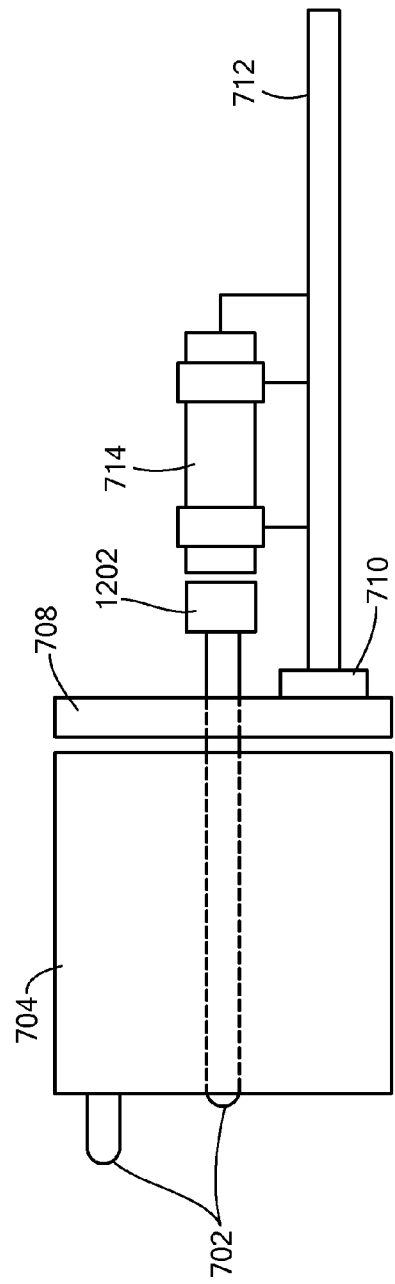

PORTABLE TRUCK TESTER

CROSS REFERENCE TO RELATED APPLICATIONS

This application claims the benefit under 35 U.S.C. §119(e) of U.S. Provisional Patent Application No. 61/466,689, entitled "PORTABLE TRUCK TESTER," filed on Mar. 23, 2011, which is herein incorporated by reference in its entirety for all purposes.

STATEMENT REGARDING FEDERALLY SPONSORED RESEARCH OR DEVELOPMENT

N/A

BACKGROUND OF THE INVENTION

Controlling the safe and proper transfer of flammable fluids when loading transportation vehicles such as tanker trucks has long been a concern in the petroleum industry. In recent years, safety devices have been implemented on tanker trucks that prevent fluid transfer from a loading terminal to the truck if certain unsafe conditions surrounding the transfer exist. These devices use detection equipment to determine if all of the safety precautions have been taken and prevent fluid flow if they have not. The electronics systems include overfill detection, grounding and vehicle identification systems. When the vehicle connects to a rack, a sophisticated controller is connected to the truck and the vehicle electronics are monitored. The fluid flow is controlled electrically and can be prevented, by closing a valve in a fluid transfer conduit, or by disabling a pump that is responsible for transferring the fluid to the tanker.

A tanker truck 100, as shown in FIG. 1, has multiple fluid containment compartments 102. The number of compartments can vary from one tanker truck to another. In the United States, tanker trucks typically have four to five compartments, and in Europe, tanker trucks can have up to sixteen compartments. Consequently, each compartment 102 can be filled with a different type of fluid; this provides for the transit of a variety of fluid types in a single truckload. Further, each compartment can have a total volume that differs from one another. Moreover, each compartment can have some remaining fluid, the amount of which can differ from one compartment to another. As a result, the amount of fluid required for filling each compartment 102 can be different.

To prevent overfilling of the compartments 102, an overfill sensor 104 is located in each compartment. In general, the sensor 104 is located near the top of the compartment to detect if the fluid within has reached a certain threshold level. The threshold level can depend on the size of the compartment or on the specific type of fluid that is being transferred into the compartment. The sensor 104 of each compartment 102 is connected to a connection socket 106. A pumping controller 108 is connected to the connection socket 106 via a plug 110. The controller 108 is therefore able to receive the signals from the various sensors on the truck (overfill, ground, etc.) and controls the filling of the tanker truck 100. When a hazardous condition is detected, such as when one of the overfill sensors indicates that the fluid in its compartment has reached the threshold level, the controller 108 will halt the filling process.

There are several types of sensors and various ways of connecting the sensors 104 to the connection socket 106 of the controller 108. For example, one sensor type has two wires and each sensor is independently connected to the connection socket. This provides a relatively simple way for the controller to monitor the sensors because, when a sensor detects an overfill condition, the controller can determine which sensor has been triggered and, therefore, which compartment is full. However, as each sensor is independently connected to the connection socket, a sufficient number of available pins are required on the connection socket for connecting the sensors all at once. This can be particularly problematic for trucks having a larger number of compartments and, therefore, requires a large number of sensors to be connected. The number of pins provided on a standard connection socket, i.e., ten, may not be sufficient.

In another example, an alternate sensor type has a connector with five wires with the overfill sensors connected together in series in a "daisy chain." That is, a detection signal from a first sensor is passed to a subsequent sensor, and so on, to the end of the sensor chain, the detection signal from the last sensor being returned to the controller. If there is an overfill condition in any one of the compartments, the sensor for that compartment will not output the detection signal, the chain is broken and the controller does not receive the detection signal. The absence of a detection signal at the output of the daisy chain indicates to the controller the presence of an overfill condition in one of the compartments. Irrespective of the number of sensors connected to the controller, the number of pins required by the daisy chained sensors on the connection socket is always the same, so the number of truck compartments that may be monitored is not limited by the socket. However, the monitoring process of the controller is more complex, since it is difficult to identify which of the daisy chained sensors is detecting an overfill condition. Moreover, unlike with the two-wire sensor, malfunctioning sensors can very easily be bypassed, leaving the compartment of the sensor unprotected from possible overfills.

The sensors 104 of the compartments 102 that are daisy chained together are connected so that the output of one sensor is the input of the next sensor. A pulse generator on the controller on the loading terminal sends a pulse to the input of the first sensor 104 and the controller 108 looks for a pulse return at the output of the last sensor 104. If the return pulse is detected, the controller 108 determines that all sensors are connected and that none of the compartments is overfilled. However, if there is no return pulse detected, the controller 108 determines that either at least one sensor is disconnected or that, in at least one compartment, the fluid has reached its overfill level, and therefore terminates the filling process for all compartments.

It is also known to provide a second checking mechanism that uses a an identification module such as the T.I.M.® electronics module from Scully Signal Company of Wilmington, Mass., to assign a unique serial number to a vehicle. The T.I.M. system, once attached to a specific vehicle, associates a unique ID, i.e., a Truck ID (TID) that can be read by several different systems. The TID is used for several purposes by the terminal automation system and rack controller 108.

As known, the T.I.M. system and associated TID can be used to validate a vehicle's authorization to load in an unmanned terminal. In such a system, the rack equipment (or terminal automation system) 108 maintains a list of authorized trucks, by TID, that are approved to load at that loading bay. If an unauthorized vehicle attempts to load, the system denies loading and records the attempt for logging or data collection purposes.

In addition, the TID can be used for verifying fuel type access. Here, a loading rack 108 checks an incoming vehicle's TID to validate that the fuel they are attempting to load is approved for that vehicle. A loading facility often has multiple loading racks, for example, one might be for dispensing diesel fuel, another for gasoline and yet another for aviation fuel as found at a military base or airport. The use of the TID for fuel verification prevents a vehicle from taking on the wrong fuel type.

In the event the truck has a failure of these electronics components it will not be allowed to load and the problem must be troubleshot and the underlying failure resolved. A truck driver, however, might not become aware of this until attempting to load fuel. Thus, a lot of time could be wasted waiting in line only to find out that fuel cannot be taken onboard. There exists, therefore, a need for a way to quickly test the onboard safety equipment on a tanker truck.

BRIEF SUMMARY OF THE INVENTION

In one embodiment, a tanker truck safety system testing device includes a microprocessor configured to run a program to determine the status of a tanker truck safety system and has a plurality of spring-loaded pins configured to couple with corresponding contact pads on the truck safety system. The plurality of pins are coupled to a plurality of inputs of the microprocessor. A first intrinsically safe power supply is controlled by the microprocessor and is coupled to a first subset of the plurality of spring-loaded pins and configured to provide a first intrinsically safe voltage to each pin individually under control of the microprocessor. A second intrinsically safe power supply is controlled by the microprocessor and is coupled to a spring-loaded pin not in the first subset of pins and is configured to provide a second intrinsically safe voltage to the one pin under control of the microprocessor. Advantageously, the first and second intrinsically safe voltages are on separate rails.

In another embodiment of the present invention, an adaptable connector includes a generally cylindrical housing having a circumferential portion defined about an opening at a first end thereof. A first pin extends radially into the opening and is located at a first position about the circumferential portion while a first through hole is radially oriented with respect to the opening and at a second circumferential position that is at a predetermined relationship to the first position. A second through hole is radially oriented with respect to the opening and at a third circumferential position that is at a predetermined relationship to the first and second positions. A first movably positionable pin is located in only one of the second and third through holes and extends radially into the opening.

BRIEF DESCRIPTION OF THE SEVERAL VIEWS OF THE DRAWINGS

The invention is herein described, by way of example only, with reference to the accompanying drawings. With specific reference now to the drawings in detail, it is stressed that the particulars shown are by way of example and for purposes of illustrative discussion of various embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several embodiments of the invention may be embodied in practice.

In the drawings:

FIG. 1 is a schematic representation of a known overfill detection and control system;

FIG. 2 is a schematic representation of a known truck connection socket;

FIG. 8 is an exploded view of the truck tester of FIG. 3;

FIGS. 12A and 12B are drawings of the operation of the magnetic proximity switch;

DETAILED DESCRIPTION

Figure 3:
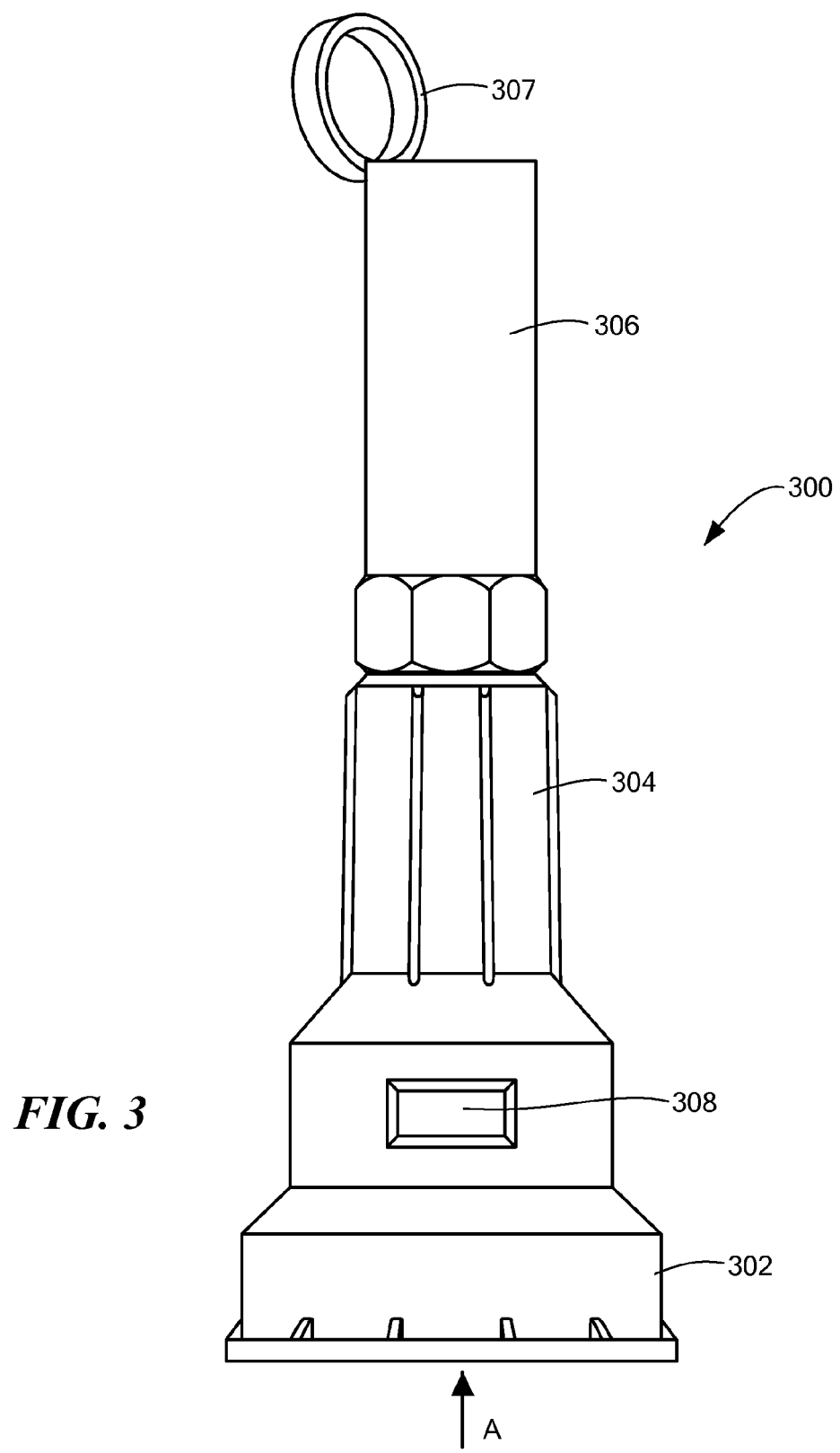
FIG. 3 is a side view of a portable truck tester in accordance with an embodiment of the present invention.

This application claims the benefit under 35 U.S.C. §119 (e) of U.S. Provisional Patent Application No. 61/466,689, entitled "PORTABLE TRUCK TESTER," filed on Mar. 23, 2011, which is herein incorporated by reference in its entirety for all purposes.

In the following description, numerous specific details are set forth in order to provide a thorough understanding of the different embodiments of the present invention. It will be understood by those of ordinary skill in the art that these embodiments may be practiced without these specific details. In some instances, known methods, procedures, components and structures may not have been described in detail so as not to obscure the present invention.

As will be described below, a hand held portable truck safety equipment tester uses criteria similar to a fuel-loading rack controller to determine that a tanker truck is ready to be loaded. Advantageously, the tester implements a method of testing the sensors and grounding system in a manner different than, but still compatible with, that of a rack controller. Advantageously, an embodiment of the present invention has the ability to test all types of trucks without the need for adapters to fit on the connections and allows for connection and remote diagnostics worldwide through the use of laptop and cell phone technology.

One embodiment of the present invention consists of a hand held portable truck safety equipment tester that uses loading rack controller criteria to confirm proper operation but is contained in a small portable battery operated unit. This unit allows for correlation to a rack controller's test and includes direct readout via an LED screen showing the error condition and a direct readout of the Truck Identification Module. Additionally, this tester has the capability to test all types of trucks without the need for adapters to accommodate different connectors and allows for connection and remote diagnostics worldwide through the use of laptop and cell phone technology. The tester can automatically determine which type of sensor is in use as well as what grounding system is used and then test them. The tester couples with a connection socket 106, as shown in FIG. 2, that includes a plurality of contact pads 202. The contact pads 202 are arranged in a specific orientation such that a particular pad location corresponds to a particular function, for example, ground, a signal input or a signal output. Thus, the plug 110 has corresponding pins, oriented in a complimentary fashion, in order to complete the electrical circuit and/or input or output appropriate signals.

As known, a truck may carry either a two-wire or five-wire configuration of sensors. Accordingly, the contact pads 202 are numbered (C1-C10) and assigned specific signals that have become an industry standard. The signals assigned to the contact pads, depending on the configuration of the sensors, are presented in Table 1.

TABLE 1

|  | Two-wire (Optic or Thermistor) | Five-wire |
| --- | --- | --- |
| C1 | Sensor 1 | Not used |
| C2 | Sensor 2 or Dummy | Not used |
| C3 | Sensor 3 or Dummy | Not used |
| C4 | Sensor 4 or Dummy | Pulse to Sensors |
| C5 | Sensor 5 or Dummy | Diagnostic Line |
| C6 | Sensor 6 or Dummy | Pulse from Sensors |
| C7 | Sensor 7 or Dummy | Not used |
| C8 | Sensor 8 or Dummy | Sensor Power |
| C9 | Ground/T.I.M. | Ground/T.I.M. |
| C10 | Ground | Ground |

A "dummy" sensor is used to "fill in" for missing sensors on a truck. If, for example, there are less than eight tanks on a truck, a dummy sensor is used to mimic, or appear as, a dry sensor for each of the unused sensor locations on the connector. A single dummy sensor apparatus can mimic up to five sensors.

In one embodiment of the present invention, a portable truck tester 300, as shown in FIG. 3, is based on a plug housing as available from the Scully Signal Company, Wilmington, Mass. It should be noted, however, that the particular choice of a connector and/or shape of a housing is not considered to be a limitation of the portable truck tester 300.

The portable truck tester 300 includes a coupling portion 302 for connecting to the connection socket 106 on, for example, a tanker truck 100. The portable truck tester 300 also includes a handle 304 to facilitate connecting and disconnecting to the connection socket 106. As shown, in one embodiment of the portable truck tester 300, the handle portion 304 is generally cylindrical and, as will be discussed below in further detail, is hollow to accommodate the internal components of the truck tester 300. A removable extension 306 is coupled to the handle portion 304 by, for example, a threaded screw. The removable extension 306, as will be detailed below, may be configured to incorporate the power source, for example, batteries, for the tester 300. The removable extension 306 may further incorporate a loop 307 to facilitate connection to the truck to assure proper stowage.

In order to represent the current status of either the truck or the tester, a display panel 308, for example, a high definition LED display, is provided in the handle 304 in order to convey information to the user. The choice of a type of display 308, however, may include, for example, any type of LED display such as an OLED display or a series of LEDs of various colors configured to convey information or any other type of screen. Essentially, embodiments of the present invention can use any of the different mechanisms available for visually conveying information to a user.

Figure 4A:
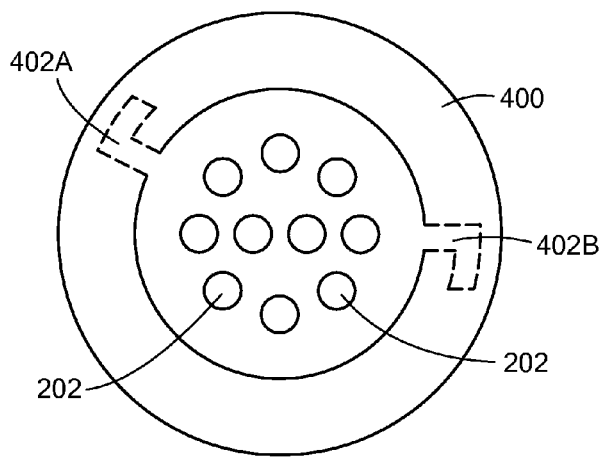
FIGS. 4A-4C represent known types of bayonet-type receptacles.
Figure 4B:
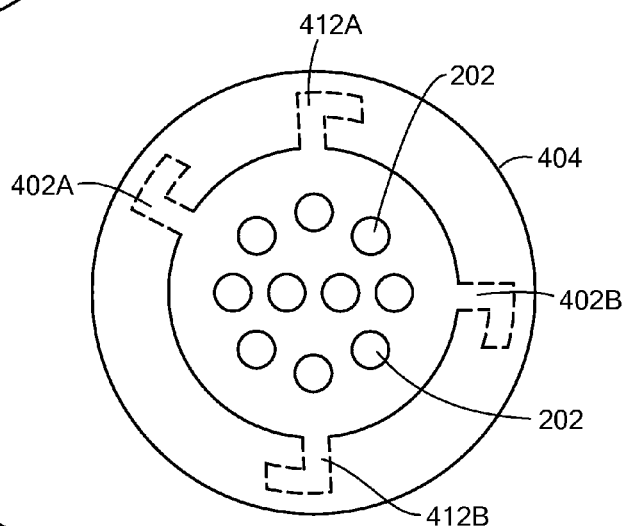
Figure 4C:
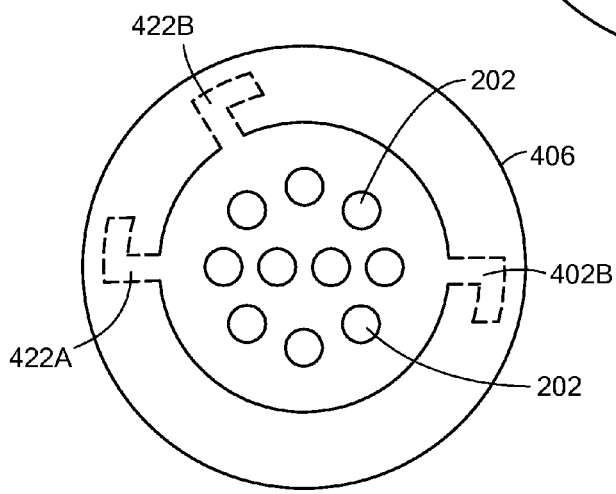

As is known, because there are two prevailing sensor types in use, i.e., the two-wire and five-wire systems, different interfaces have been established. These differing interfaces are meant to prevent a plug 110 meant for use on a two-wire truck from being plugged into a connection socket 106 on a five-wire truck and vise-versa. Thus, as shown in FIG. 4A, a first type of a receiver 400, referred to a 2J receiver includes two J-slots 402A, 402B located, as looking straight at the 2J receiver 400, at three o'clock and ten o'clock. As is known, a connector would require pins located at these corresponding points on the perimeter in order to make proper connection to the contact pads 202. In order to improve the reliability of the 2J connector, a connector as shown in FIG. 4B, sometimes referred to as a 4J connector 404 was developed. As can be seen, the 4J connector added two more J slots 412A, 412B at the twelve o'clock and six o'clock positions. Still further, the five-wire sensors use a 3J configuration as shown in FIG. 4C. The 3J configuration includes the three o'clock J-slot 402B along with a nine o'clock J-slot 422A and an eleven o'clock J-slot 422B.

Advantageously, the truck tester of the present invention incorporates a mechanism for coupling to any of the 2J, 3J and 4J connection configurations.

Figure 5A:
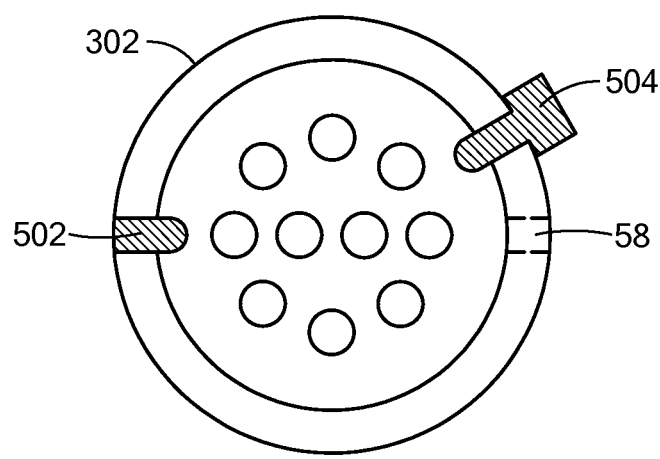
FIGS. 5A and 5B represent a bottom view of the truck tester in accordance with an embodiment of the present invention.
Figure 5B:
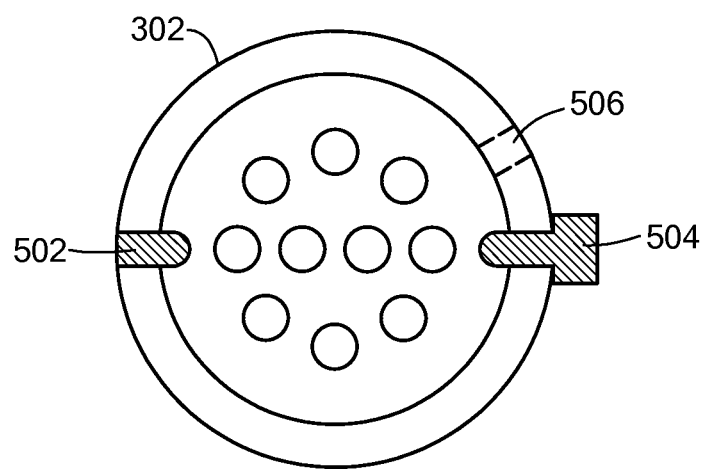

Referring to FIG. 5A, a view of the truck tester 300 from the direction A as shown in FIG. 3, the coupling portion 302 of the truck tester 300 includes a fixed pin 502 located at, from the direction looking at the "bottom" of the tester 300, the nine o'clock position in order to couple with the three o'clock position of the 2J, 3J and 4J configurations. A movable pin 504 is provided and can be located in either a two o'clock slot 506 or a three o'clock slot 508 to couple, respectively, with the ten o'clock slot of the 2J and 4J configurations or the nine o'clock slot of the 3J configuration.

The moveable pin 504 may be positioned in either of the slots 506, 508 by being screwed in, operation of a cotter pin, etc. Further, a moveable pin 504 may be placed in each of the slots 506, 508 and the one that is not necessary is retracted so as not to interfere with the connector. The retracted moveable pin 504 may be kept in position by operation of, for example, screwing out the moveable pin 504 or implementation of a cotter pin or a combination of turning and the addition of a detent on the moveable pin 504 that is captured by a portion of either of the slots 506, 508.

Figure 6:
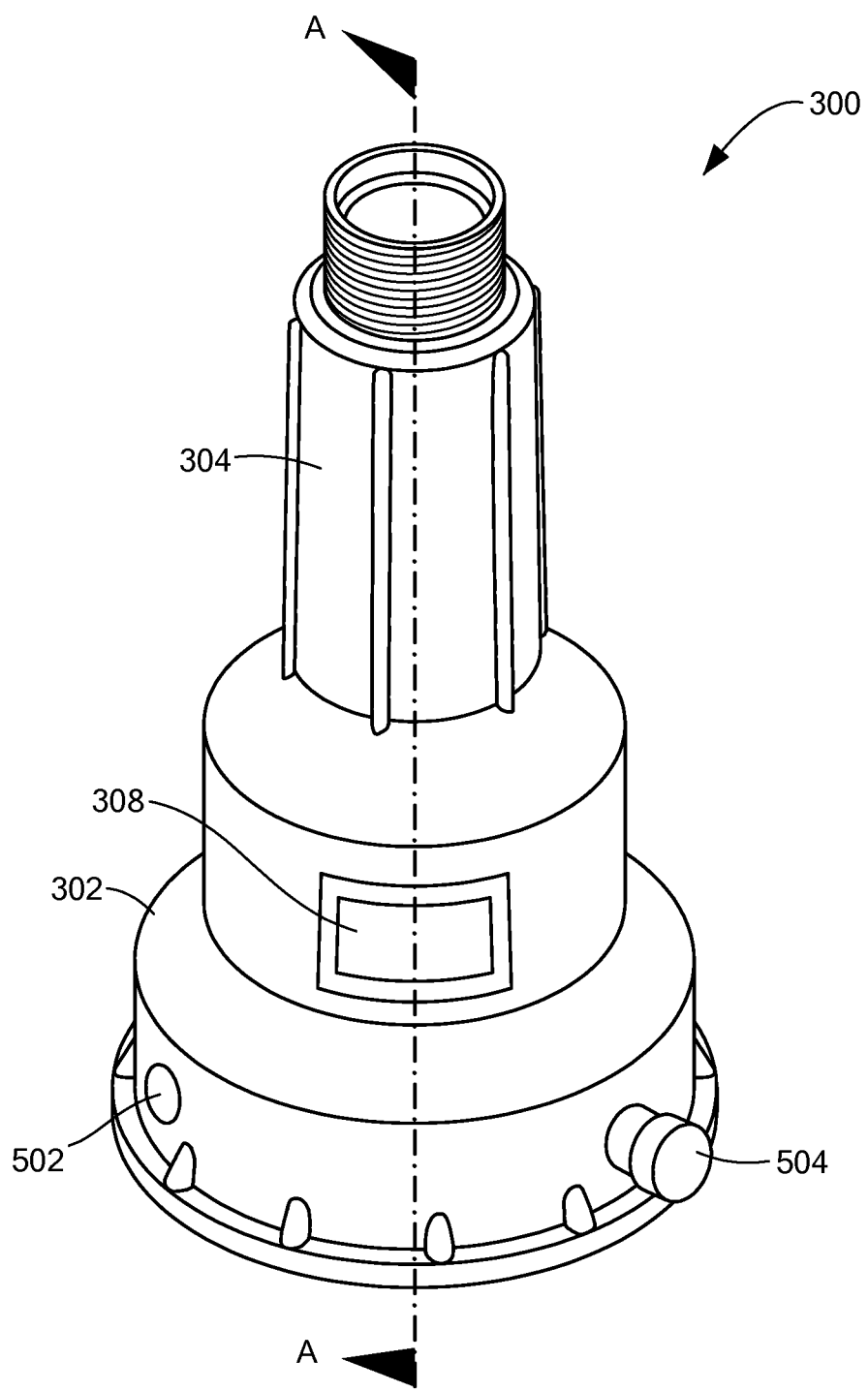
FIG. 6 is a perspective view of the portable truck tester shown in FIG. 3.

As shown in FIG. 6, the fixed pin 502 is at the nine o'clock location while the moveable pin 504 is shown as being inserted in the two o'clock position.

It is understood that the connect pads 202 on the connection socket 106 undergo a tremendous number of connect and disconnect cycles during their operating lifetime. Thus, a reliable mechanism to connect to the contact pads 202 is necessary. Accordingly, embodiments of the present invention provide for spring-loaded pins that are able to accommodate a connection socket 106 that, perhaps through regular use, results in contact pads 202 that vary in height or are a variable distance from the originally set up connector. The spring-loaded pins and their associated mechanics and electronic systems are provided within the interior of the truck tester 300.

Figure 7:
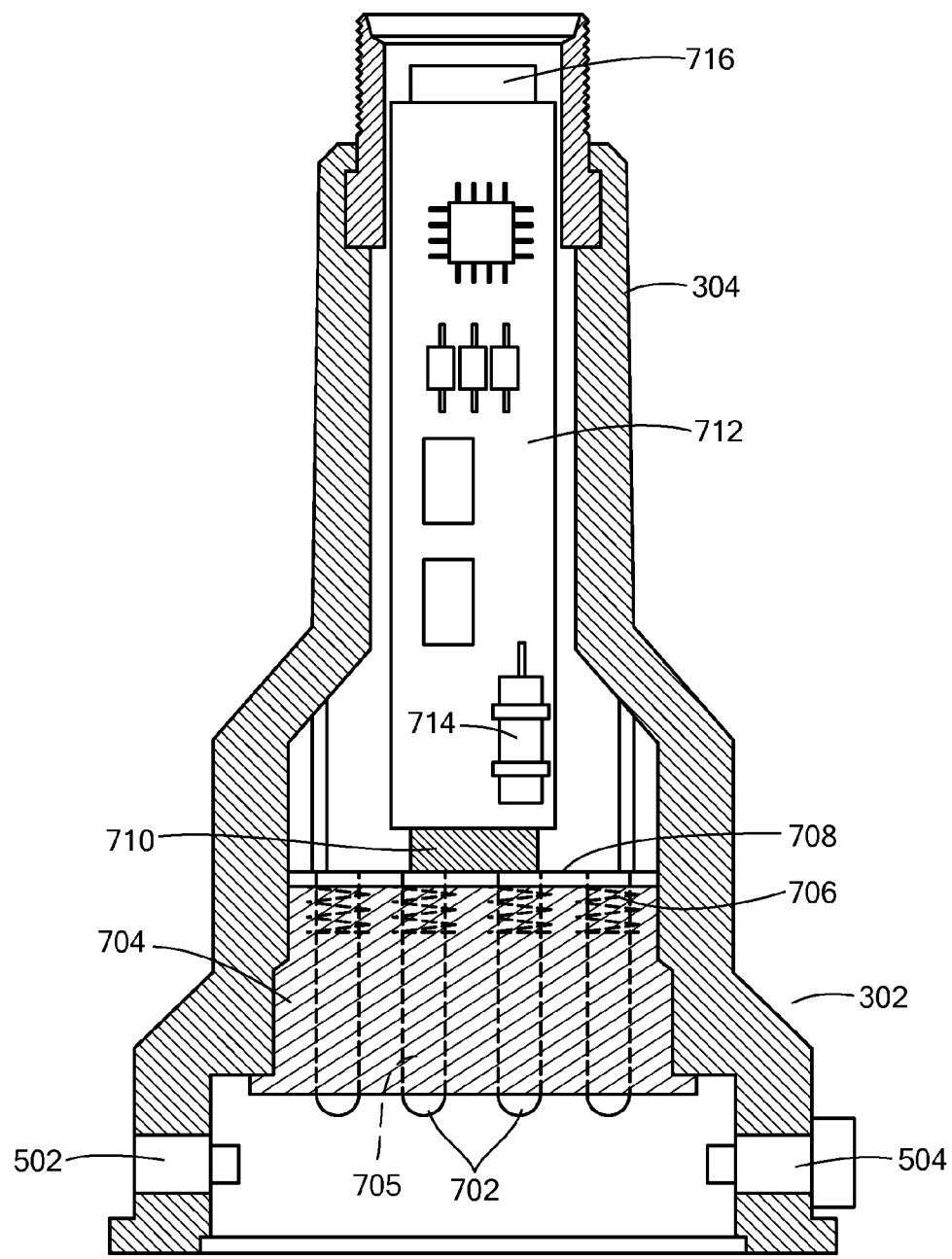
FIG. 7 is a cut-away view of the truck tester of FIG. 3.

Referring to now to FIG. 7, a cut away view of the truck tester 300 as shown in FIG. 6 along the line A-A, a plurality of contact pins 702 are provided within a mating block 704 where each contact pin 702 is within its own respective conduit or tube 705. Each contact pin 702 has a corresponding spring 706 that is configured to urge the contact pin 702 towards any corresponding contact pad 202. A contact PCB 708 is mechanically coupled to the mating block 704 as well as electrically coupled to the respective springs 706. The details of this configuration will be described in more detail below.

A contact PCB connector 710 is provided on the contact PCB 708 and a tester PCB 712 is plugged into the contact PCB connector 710. As a result of the connection of the tester PCB 712 to the contact PCB connector 710, the devices and circuitry provided on the tester PCB are in electrical contact with the contact pins 702 via the springs 706 and, when the tester 300 is coupled to a truck, further, in electrical and functional contact with the devices on the truck under test.

A magnetic proximity switch 714 is provided on the tester PCB 712. The magnetic proximity switch 714 is used to determine when the tester 300 has been connected to a truck. The operation of the magnetic proximity switch 714 and the corresponding circuitry on the tester PCB 712 will be described in more detail below.

The tester PCB 712 includes a service port connector 716. The service port connector 716 is used to, in one configuration, provide power to the circuitry on the tester PCB 712 or, in an alternate configuration, to provide power to the circuitry on the tester PCB 712 in addition to providing an interface through which the tester can either be programmed or through which the tester 300 can communicate with other devices, for example, a central data receiving office or data repository via an external computer, for example.

As shown in FIG. 8, an exploded view of the truck tester 300 as shown in FIG. 7, the contact pin 702 and corresponding spring 706 are placed in the corresponding conduit or tube 705 of the mating block 704. The contact PCB 708 is then mechanically coupled to the contact pin 702 by operation of a lock ring 802. In addition, the contact PCB 708 includes a plurality of contact traces 804, disposed around corresponding contact rings 806 that receive the contact pin 702.

Each contact ring 806 has a contact trace 804 disposed around its circumference on each side of the contact PCB 708. The contact trace 804, therefore, transfers the signal to the contact PCB connector 710 through suitable etches on the contact PCB 708 in order to convey the signals to the circuitry on the tester PCB 712.

In operation, the contact pin 702 will be in mechanical and, therefore, electrical contact with the contact pad 202. The spring 706 will also be in electrical contact with the contact pin 706. In order to provide for a more reliable electrical connection, the signal is carried through the contact spring 706 coupled to the contact trace 804 on the underside of the contact PCB 708. The contact rings 806 have a number of vias that connect the top and bottom of the board to assure that any wear in the inside of the contact ring 806 does not affect electrical connection quality. Advantageously, while the contact pin 702 is free to move up and down with respect to the varying height of the contact pad 202, the spring 706 maintains its connection with the contact trace 804 and therefore provides a reliable transmission of any signal to or from the contact pad 202.

Figure 9A:
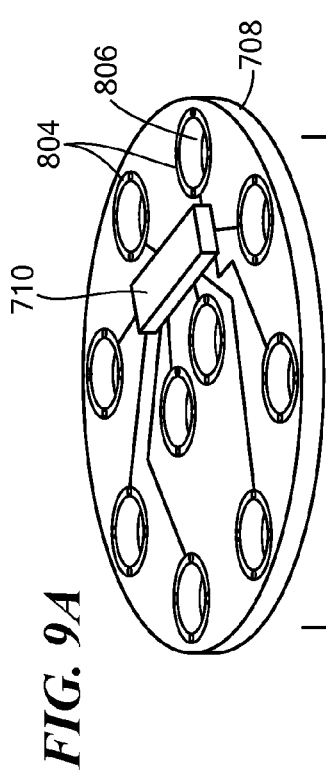
FIGS. 9A and 9B are exploded views of components of the tester.
Figure 9B:

As shown in FIGS. 9A and 9B, the contact PCB 708 has contact rings 806 arranged to correspond with the openings 705 found in the mating block 704.

Figure 10:
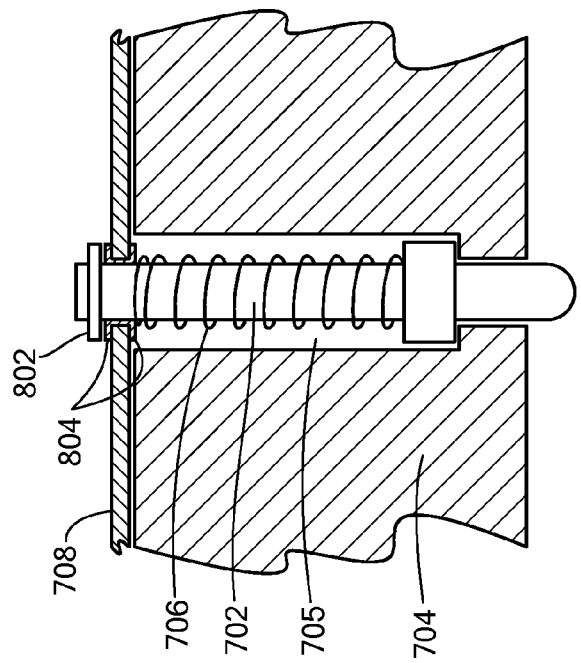
FIG. 10 is a cross-sectional drawing of the contact block.

As shown in FIG. 10, a cross-section of the contact block 704, the contact pin 702 is urged by the contact spring 706 in a direction opposite to any force that might be applied by a contact pad 202 pressing against the pin 702. The spring 706 is in electrical and mechanical contact with the contact trace 804 surrounding the contact rings 806 through which the contact pin 702 protrudes.

Figure 11:
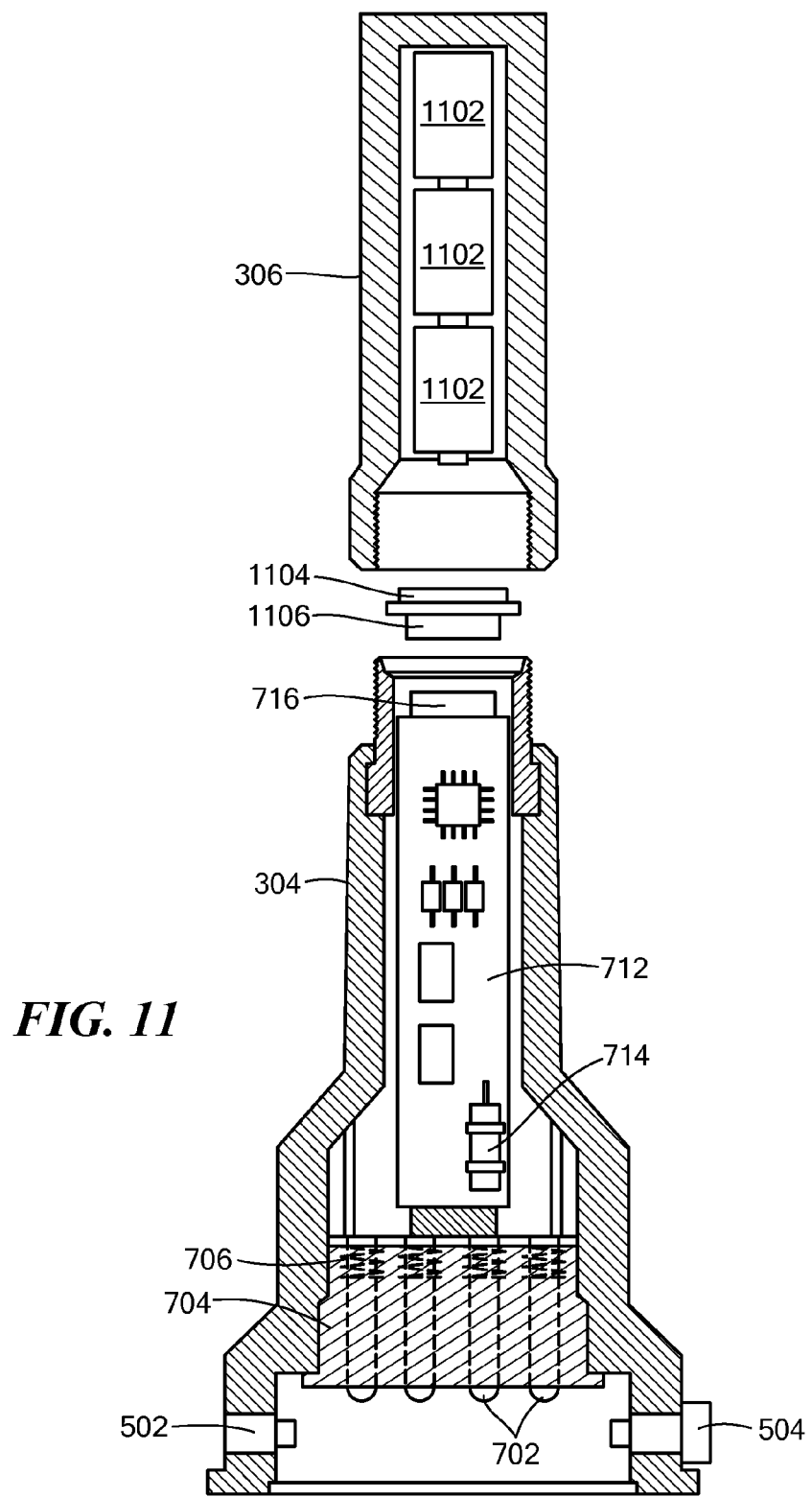
FIG. 11 is a cut-away or cross-sectional view of the truck tester of FIG. 3.

As shown in FIG. 11, the removable extension 306 is a hollow cylindrical portion within which a plurality of batteries 1102 are provided in order to power the circuitry on the tester PCB 712. In one embodiment, power is derived from a nine volt battery stack and boosted to 12 Volts in the unit.

A battery contact 1104 is provided on a battery contact plug 1106. The battery contact plug 1106 is inserted into the service port connector 716 of the tester PCB 712 in order to provide power from the batteries 1102 to the circuitry thereon. When the battery contact plug 1106 is removed, an external plug can be connected to the service port connector 716 in order to access and/or control circuitry on the tester PCB 712. It should be noted that the tester 300 may be powered by plugging into the auxiliary output, usually, twelve volts, found on the truck.

In one embodiment of the present invention, the truck tester 300 is normally powered off and does not turn itself on until it detects that is has been plugged onto a truck's connection socket 106. Thus, one of the pins 702 includes a magnet 1202 positioned on the end of the pin 702 that is above the contact PCB 708, as shown in FIGS. 12A and 12B. This pin is distinguished from the others by having, for example, a different geometry or some other identifier, for example, a different color, when viewed from the bottom of the tester. The magnetic proximity switch 714 is positioned on the tester PCB 712 so as to detect when the particular contact pin 702 has made contact with a contact pad 202 and has been urged towards the magnetic proximity switch 714. Thus, as shown in FIG. 12B, when the magnet 1202 is within a predetermined distance of the magnetic switch 714, the electronics on the tester PCB 712 will power up and commence testing the equipment on the truck.

The magnetic proximity switch 714 is also used in configuring the unit. The user changes settings by pressing this pin in order to enter a command mode where the tester can be reconfigured. Advantageously, using the switch 714 provides for a way to turn the unit off and on as well as allows the user to change its configuration. Further, more than one pin may be provided with a magnet and have a corresponding switch in order to provide more input options or a redundant indication of connection. Still further, while a magnetic proximity switch is described, alternate types of switches may be used.

Figure 13:
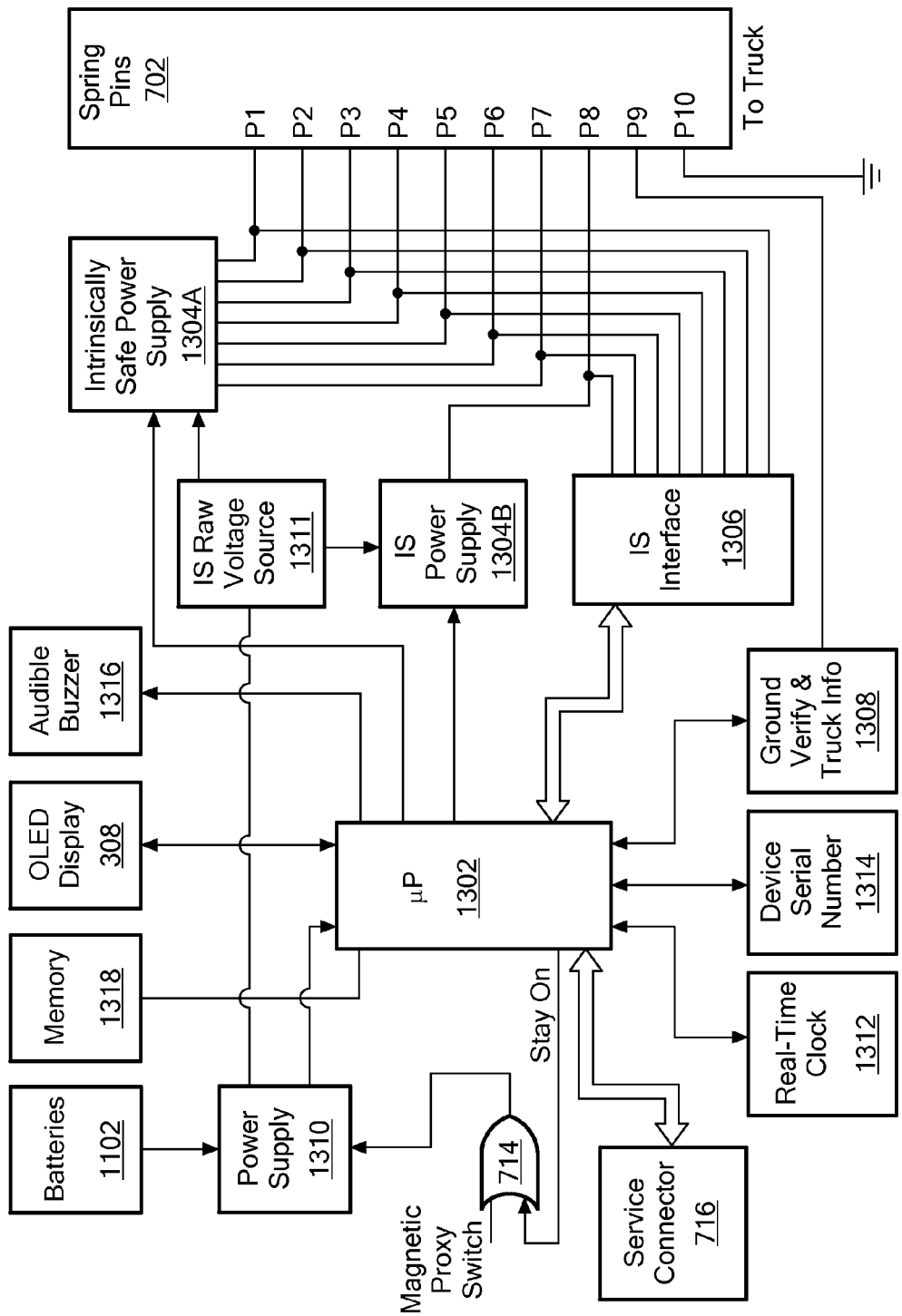
FIG. 13 is a functional block diagram of the components of the tester PCB.

The tester PCB 712 includes a plurality of devices mounted on the tester PCB 712 and connected to one another in order to provide a comprehensive test of the electronics on a corresponding truck. As shown in FIG. 13, a functional block diagram of the devices on the tester PCB 712, the central functional block is a microprocessor 1302 running various tests and processes, via firmware, as will be described in more detail below. The microprocessor 1302 includes internal analog to digital (ADC) processing to obtain accurate analog measurements. In one embodiment, the microprocessor 1302 is a dsPIC30F5011 Digital Signal Controller from Microchip Technology, Inc. of Chandler, Ariz.

An internal power supply 1310 provides power to the microprocessor 1302 and the devices on the board. The power supply 1310 generates its output voltage from the batteries 1102.

An intrinsically safe raw voltage supply 1311 receives power from the internal power supply 1310 and generates two separate intrinsically safe voltage outputs or "power rails." These two voltage outputs are used to separately power different groups of pins by, respectively, two separate intrinsically safe (IS) power supplies 1304A and 1304B that are used to provide intrinsically safe power to the pins 702 in order to provide power and/or signals to the truck under test.

Each of the IS power supplies 1304A, 1304B is controlled by the microprocessor 1302 to provide power to the pins separately or in any combination. The first IS power supply 1304A provides power to pins P1-P7. The second IS power supply 1304B provides power to just pin P8. Thus, the "power rail" applied to pins P1-P7 is different from that applied to pin P8. This separation provides an advantage in that voltage measurements made on the pins P1-P7 are separated from those on the pin P8 and, therefore, more accurate testing due to minimized interference or cross-over on the voltage supply lines is provided.

The microprocessor 1302 receives or detects signals from these same pins as well, but through an intrinsically safe current limiter 1306 provided inline between the microprocessor 1302 and the spring pins 702. As the truck tester is used in an environment in which extraneous sparks or voltage or current signals must be carefully controlled in order to prevent catastrophic consequences, an intrinsically safe interface is provided at the spring pins 702.

A ground verify or detection and truck information module (T.I.M.) tester 1308 is in communication with one of the pins 702 as well as with the microprocessor 1302. The ground detection circuit 1308 includes the capability to detect either a resistive or a ground bolt mode of grounding equipment and to verify operation.

The internal power supply 1310 is controlled by the microprocessor 1302. In other words, once the power supply has started it is under control of the microprocessor 1302 which allows for better battery power management.

A real time clock module 1312 provides the microprocessor 1302 with real time date and time information. With the onboard real time clock 1312, a license expiration date and custom configuration can be stored. When the current date reaches the expiration date, for example, a message is reported and the tester will no longer perform any truck testing.

The magnetic proximity switch 714 is used to turn on the power supply 1310 and, therefore, when the truck tester 300 is not connected to a truck under test, power is generally being conserved. Once the magnetic proximity switch 714 detects that the truck tester 300 is coupled to a truck under test, the power supply 1310 turns on and the microprocessor 1302 initiates its startup program and then also, from that point forward, controls the operation of the power supply 1310 and, at the completion of testing, will shut itself down.

A memory component 1318 is provided to store the program run by the microprocessor 1302. This memory component 1318 may include non-volatile and volatile RAM as known to those of ordinary skill in the art. In addition, I/O devices necessary to communicate through the service connector 716, if not already provided for within the microprocessor 1302, are included although not shown. Still further, the system could include a small hard drive for storing even more data.

A device serial number module 1314 is used to hold a serial number value that can be accessed by the microprocessor 1302. Such a serial number may be used to confirm that a valid license is in place in conjunction with the real time clock in order to operate the corresponding truck tester module 300.

As the environment in which the truck tester 300 may be used is often not amenable to allowing for easy viewing of the display 308, embodiments of the present invention provide an audible buzzer 1316 that is asserted when the truck tester has completed its test. In this way, a user may be notified that the testing is complete and the results may be observed for a predetermined amount of time afterwards by disconnecting the truck tester from the truck and viewing the information on the display 308.

The tester PCB 712 may be potted, i.e., covered with a compound to protect the components mounted thereon. The potting compound may be an epoxy or other similar material.

There were particular issues that had to be addressed in designing a tester that would be able test for various configurations of trucks that are found in the fuel carrying fleets around the world. One issue is that there are "dummy" sensors provided on trucks in order to account for unused or not-present tanks. The dummies, however, take power from pin 8 and provide what looks like sensors for up to five sensors. In order to account for this, the total sensor count for two-wire sensor systems must be six or eight. This is because without power all dummies sensors would look bad. The five-wire sensors use five wires simultaneously and require power on pin 8 which did not interfere with the sensor being tested. This was addressed by having a separate IS voltage supply that could be attached to pin 8 and power either a dummy in two-wire mode or provide power in five-wire mode.

As a result, the sensing circuits on pins 1, 2, 3 and 7 are identical to one another; pin 8 can be independently powered for a Dummy or for five-wire testing; pin 5 can have an independent pull-up resistor for determining which five-wire sensor is wet; pin 4, while identical to pins 1,2 and 3 is also used to generate pulses for five-wire sensors. In this mode, a return pulse is expected back on pin 6 if the sensor is dry.

Figure 14:
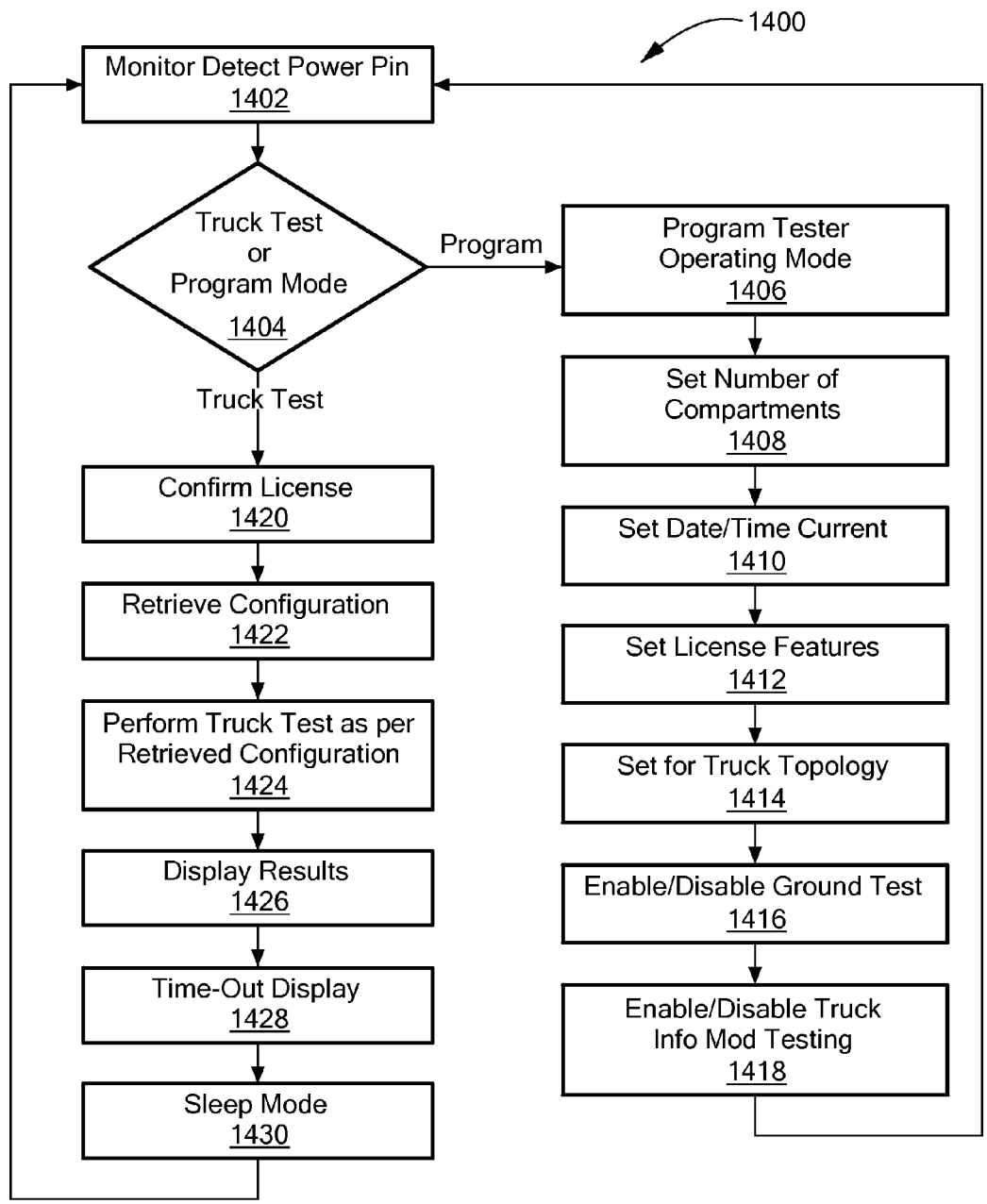
FIG. 14 is a flowchart showing an overview of the testing process.

As an overview of operation, a method 1400 as shown in FIG. 14, starts initially at step 1402 where a power pin, i.e., the pin with the magnet on it that identifies that the tester has been coupled to a truck, is monitored. Thus, the tester is in an unpowered state normally. When connected to a truck socket, the pin with the magnet is pushed against the magnetic switch. The magnetic switch closes and applies power to the power supply and the microprocessor is initialized. Once initialized, the microprocessor asserts a signal to maintain power to the tester in a bootstrap type of operation.

Subsequently, upon detection of connection to a truck it is determined, step 1404, whether the truck test has been initiated or a programming mode has been entered. The entry into the programming mode may be determined by counting the number of times that the power pin is pressed. For example, if the pin is pressed five times in relatively quick succession, the system will determine that it should enter into programming mode at step 1406.

In the programming mode the number of compartments for the truck may be set, step 1408, or the current date and time may be set, step 1410, or license features associated with the truck tester may be established, step 1412. In addition, the particular topology may be set, step 1414 as well as enabling or disabling the ground test 1416. The enabling or disabling of the ground test is established as there may be some trucks that do not have the type of grounding system that can be tested from the connector. Thus, that test would be skipped.

Finally, the truck information module (T.I.M.) testing may be enabled or disabled, step 1418, because not all trucks may have this functionality on them.

Returning to step 1404, if it is determined that the tester has been connected to a tanker truck, the truck test proceeds to step 1420 where the license information is confirmed by checking the date and time against the serial number to determine if operation is allowed. If the operation is allowed, then the configuration information is retrieved, step 1422, and at step 1424 the truck tests are performed per the retrieved configuration. Once all the tests have been conducted, or the truck has failed at a point where no more tests would be run, the results are displayed at step 1426. This display continues for a predetermined amount of time in order to allow the user to remove the tester from the truck but still have the displayed information available for viewing, step 1428. After it has been determined that the tester has been disconnected from the truck for a predetermined amount of time the system will go into sleep mode, in effect shutting down, step 1430, and wait for an assertion of the power pin being manipulated again in order to power up.

Overfill sensors indicate that a corresponding tank chamber is at capacity by providing an indication when the sensor is "wet." Thus, a full tank has a "wet" sensor and a tank that can accommodate more fuel has a "dry" sensor. In addition, these sensors "fail-safe" in that a defective sensor presents as being wet but a sensor that presents as being dry is working properly and not wet, i.e., the corresponding tank is not full. As a result, a sensor that returns a "wet" status is either defective or is working properly but in a full tank. The fail-safe mode prevents a fuel spill from occurring as the filling system will not put fuel in a tank indicating that it is full (a wet sensor) and it is better to assume a tank is full until there is confirmation otherwise.

In the description below, a sensor is described as either passing or failing. In some tests, a sensor may be identified as failing if, for example, the tester is unable to receive a signal where one is expected or receives a signal that is out of an expected range or set of parameters. In the context of the present invention, a sensor may be "wet" if its corresponding tank chamber is full. When tested, however, a sensor that reports as being wet is not necessarily in a failed condition, that is, it might not be defective, as it may be the case that the particular chamber is, indeed, full and this condition may or may not be known to the driver. It could be the situation that the driver is attempting to fill another one of the chambers. Thus, where appropriate, it should be understood that an indication of a "failed" sensor is only used as an indication of the state of the sensor. In other words, the testing of sensors as used herein is meant to be an ascertaining of the status of the sensor, for example, dry, wet or not responding within acceptable parameters. It will be up to the driver to interpret the report of the tester if, for example, the tester is reporting a tank chamber as being full when the driver expects that it is empty.

Figure 15:
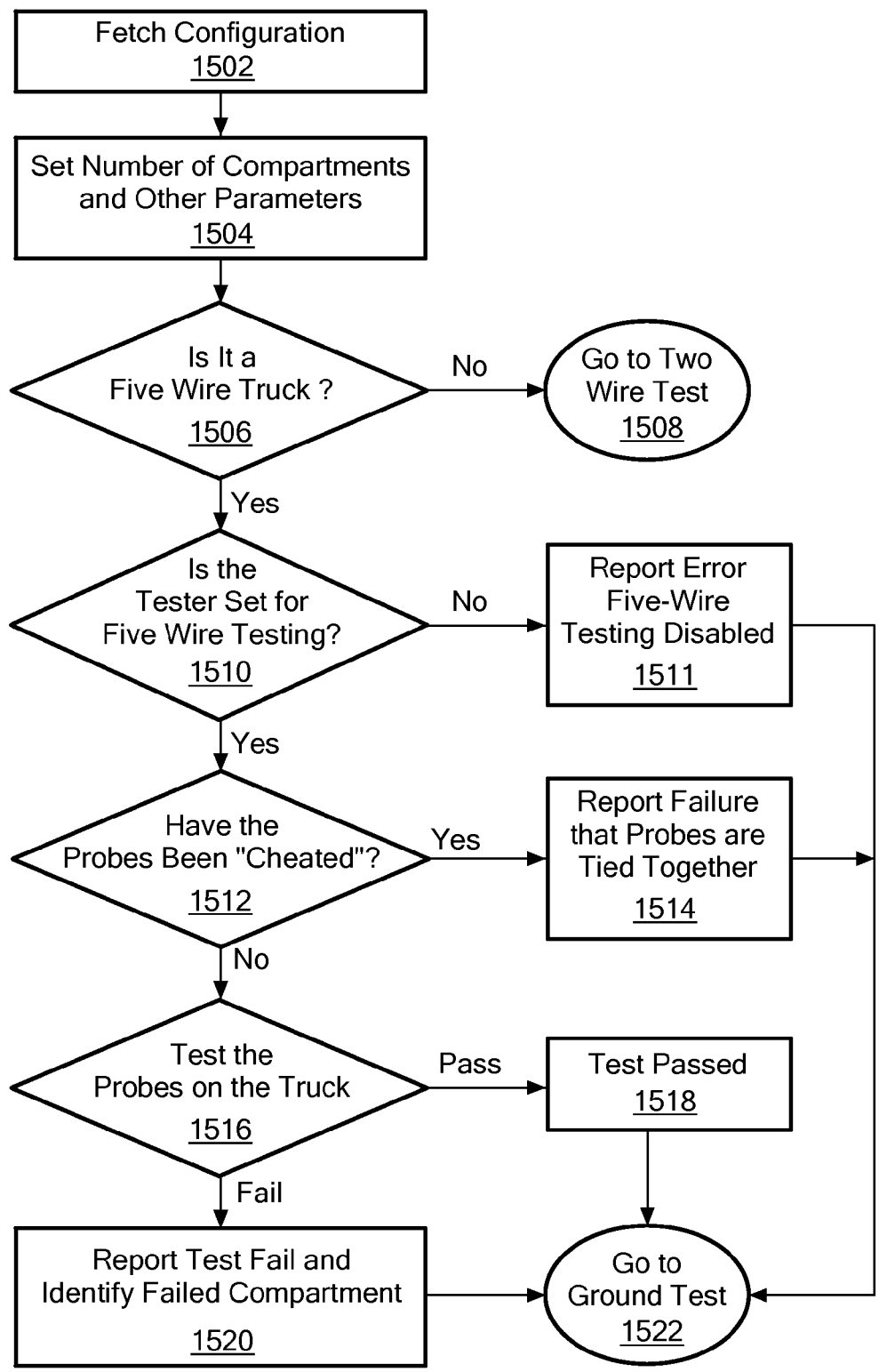
FIGS. 15-19 are flowcharts of sub-tests performed in accordance with an embodiment of the present invention.

The truck testing performed at step 1424 includes a plurality of tests and subtests. Therefore, referring to FIG. 15, the truck tester of step 1424 starts with step 1502 where the configuration is fetched and the number of compartments and other perimeters is set in step 1504. At step 1506 its determined if this tester is connected to a five-wire truck and, if not, control passes to step 1508 where a two-wire test is implemented. The determination as to whether it is five-wire, in one embodiment, involves checking for open voltages on particular pins.

If, however, it is a five-wire truck then control passes to step 1510 to determine if the tester itself is configured for five-wire testing. If not configured for five-wire testing then control passes to step 1511 to report an error condition, e.g., five-wire testing disabled on the tester, and then to step 1522 to perform a ground test. At step 1512 a test is performed to determine if the sensors have been "cheated." In other words, a determination as to whether any of the sensors have been bypassed. The "cheating" test, in one embodiment, includes sending a pulse out on one pin and calculating the return time on another pin to determine if they are tied together, e.g., looking for pin P4 and pin P6 to be tied together.

If it is determined that sensors have been bypassed then in step 1514 a failure report is generated that the sensors are tied together and the test continues with a ground test, step 1522.

If the results determine that there has been no cheating then control passes to step 1516 where the sensors on the truck are tested. The sensor test, in one embodiment, includes a test that is repeated a predetermined number of times. Each time, a pulse is sent through and then an output on the diagnostic line is retrieved.

If all sensors pass, step 1518 then control passes to step 1522 to perform a ground test. If one or more sensors on the truck fails, however, then control passes to step 1520 where it is recorded that this test failed and the failed compartment is identified subsequent to which the ground test is performed, step 1522.

Figure 16:
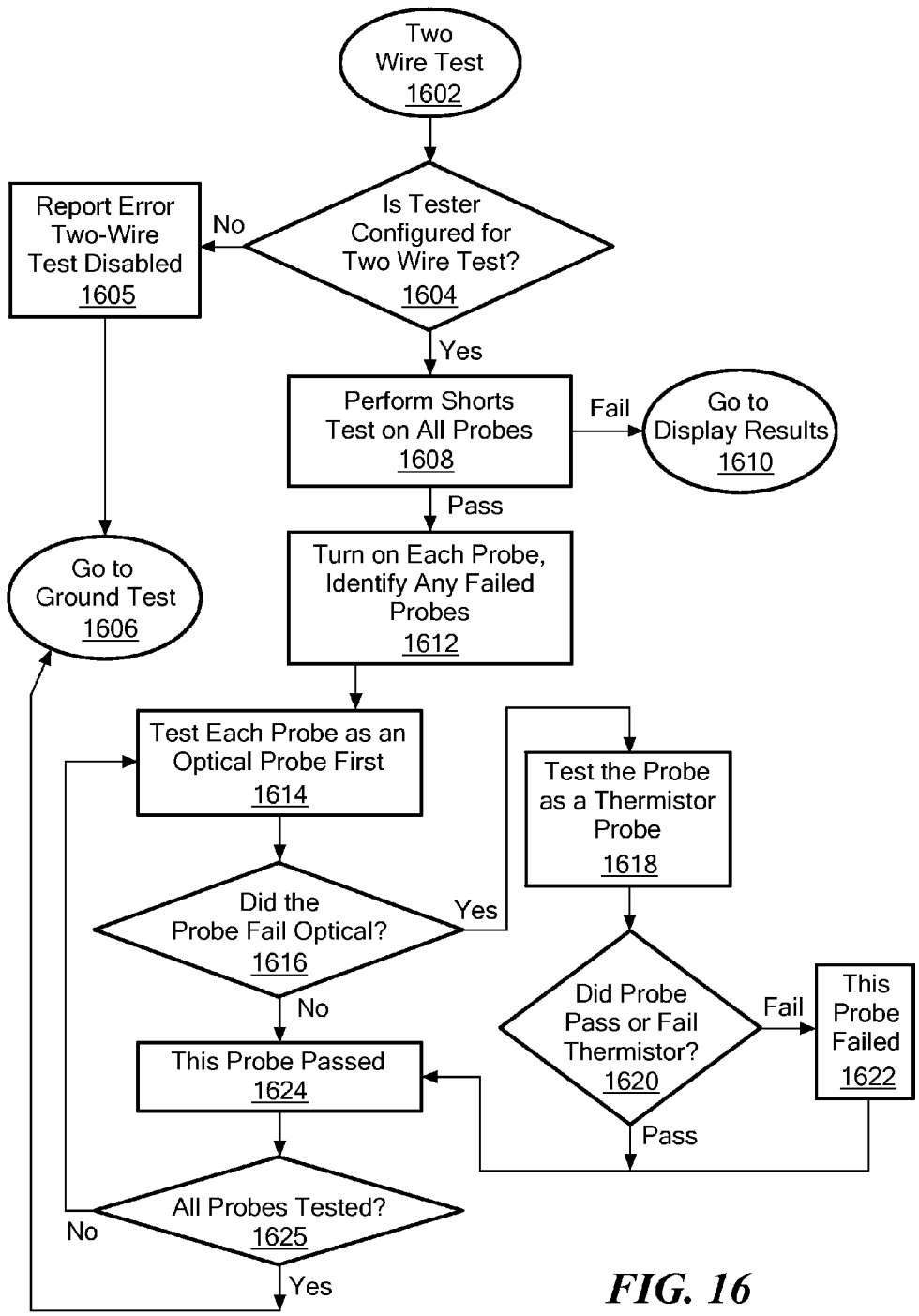

The two-wire test starts with step 1602, as shown in FIG. 16, followed by step 1604 where it is determined if the tester is configured for the two-wire test. If the tester is not configured for two-wire testing then, at step 1605, the tester reports that the two-wire testing is disabled and control passes to step 1606 to perform the ground test.

If the tester is configured for two-wire test then control passes to step 1608 where a shorts test is performed on all sensors. The shorts test includes turning off all of the sensors and measuring the voltages to determine that each is below a predetermined threshold. If the voltages are below the threshold, then measure the voltages on two different subsets of pins to assure that one set is above a first threshold and the other set is below a second threshold. If any of the sensors fails then control passes to step 1610 and the results are displayed.

If all of the sensors pass the shorts test then control passes to step 1612 where each sensor is turned on and any failed sensors are identified. Here, a plurality of pulses are sent to each sensor in order to see if the sensor is operating correctly. Subsequently, step 1614, each sensor is tested as if it were an optical sensor. If any of the sensors are determined to have failed, step 1616, then control passes to step 1618 and the sensor or sensors that have failed are tested as thermistor sensors.

A known test protocol for thermistor sensors is to put them in oscillation and verify the oscillation occurs. There is, however, no ability to do this from the connector so the characteristics of the thermistor must be measured directly. Advantageously, a method to test for thermistor sensors from the connector has been developed.

A current is applied to the thermistor sensor and followed by immediately reading the voltage which is directly proportional to the resistance. This reading is stored and the current is continued to be applied for a period of time, about 100 mS, when the voltage is again read. If a thermistor is present, the self-heating due to the current will have lowered the resistance and the voltage should follow accordingly. If the voltage drops, the sensor could be a thermistor and the lower voltage is saved and the next device is tested.

Once all devices are tested in this way, a second pass is performed to see if the resistance has gone up during the time the other sensors were being tested. Thus a heat/cool verification is done which verifies operation of the thermistor sensor.

If the sensor fails the thermistor sensor test, step 1620, then at step 1622 the sensor is identified as having failed. If the sensor passes the thermistor sensor test at step 1620 then control passes back to step 1624 and that particular sensor is identified as having passed the two-wire test. Subsequently, if all sensors have been tested, as determined at step 1625, then control passes to step 1606 to perform a ground test. Otherwise, control passes back to step 1614 to test the remaining sensors.

As known, there are at least two ways to implement ground on a truck to prevent sparks during filling: diode or resistive grounding. As a result, there needs to be a way to determine if a diode or resistive ground was present on a truck. In accordance with one embodiment of the present invention, two test circuits are provided and the determination is made by the microprocessor to determine which type was present by testing.

Figure 17:
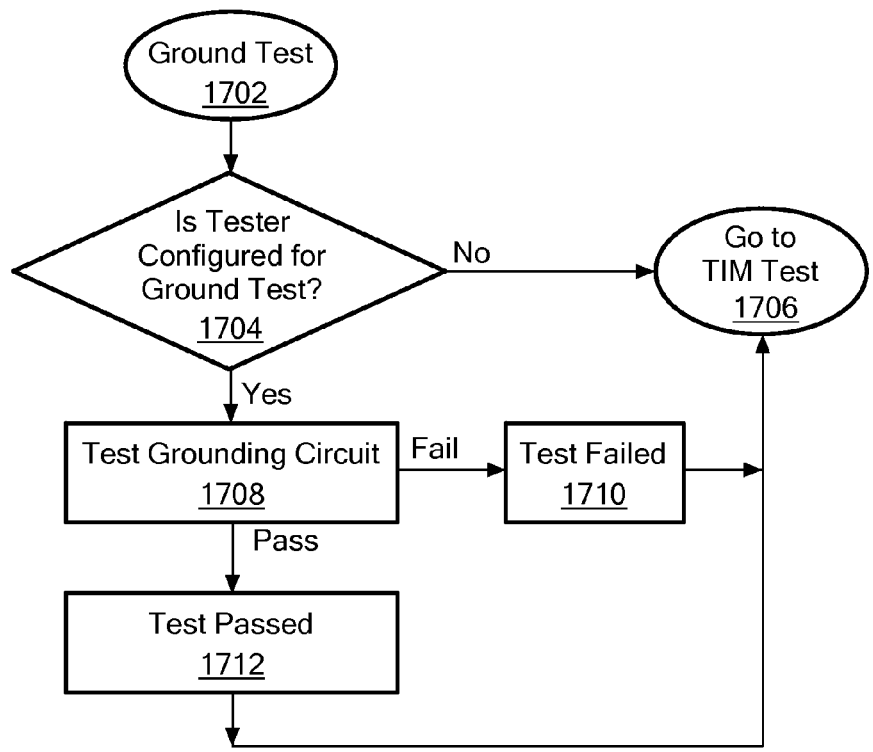

The ground test is entered, as shown in FIG. 17 and determines, step 1704, whether the tester is configured for a ground test. If not, control passes to step 1706 to perform the T.I.M. test. If the tester is configured for a ground test, control passes to step 1708 where the grounding circuit is tested. The test involves charging a capacitor and then connecting it to the pin that would be connected to a grounding circuit on the truck. The time it takes to discharge to below a threshold level is measured and if this time is below a predetermined time, then it is tested as a resistor ground, otherwise, tested as a diode ground. If it fails, the ground test is identified as having failed, step 1710, and the T.I.M. test is then performed. Alternately, at step 1712 the ground test is identified as having passed and then the T.I.M. test is performed.

Figure 18:
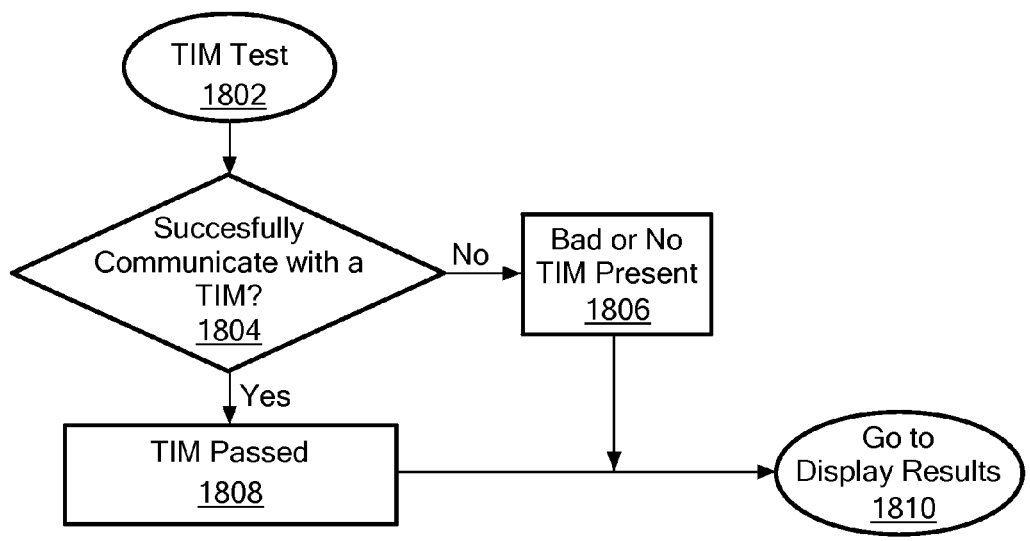

As shown in FIG. 18, the T.I.M. test comprises step 1804 where an attempt to successfully communicate with a T.I.M. on the truck is performed. In one embodiment, a reset command or serial number request is sent and it is determined if a valid response is received. If the attempt is not successful, then step 1806 identifies that either there is a bad T.I.M. or no T.I.M. present on this truck. Alternately, step 1808 if the attempt to communicate is successful then the test identifies that the T.I.M. has passed step 1808 followed by displaying the results.

Figure 19:
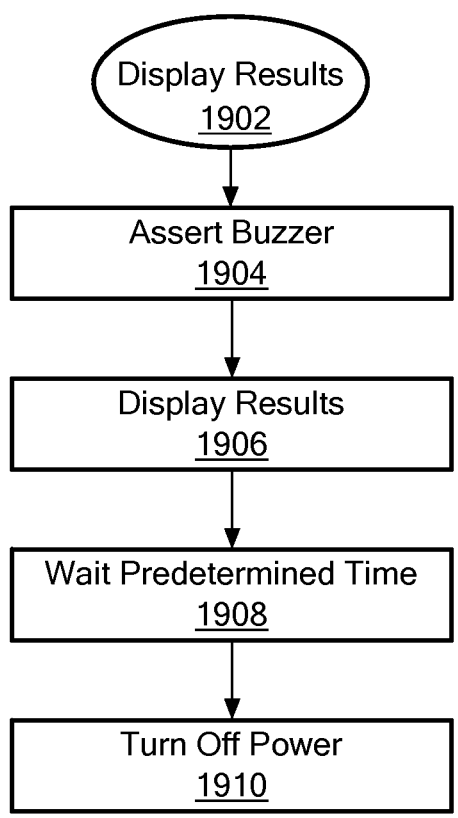

The results are displayed in accordance with the method shown in FIG. 19. At step 1904 the buzzer is asserted to alert the user as to the completion of the test. The results are displayed, step 1906 for a predetermined time, for example, 20 seconds, as determined in step 1908 after which the power is turned off, step 1910.

In one embodiment of the present invention, the features and functions of the microprocessor 1302 may be modified by accessing the tester through the service port connector 716. As described above, the 1104 battery contact is removable and presents the multi-pin connector 716. A programming system, such as an appropriately programmed computer, either a desktop or laptop, PC, Mac, etc., can communicate with the microprocessor 1302. The program that the microprocessor 1302 runs can then be modified, debugged, removed, etc. In addition, the license information can be modified and any operating information, for example, truck test history results, can be retrieved. A mobile device, for example, a smart phone or smart pad, may be connected to the tester if appropriately programmed.

Still further, the truck tester may be connected to the Internet, either by wire or wirelessly, e.g., a wireless protocol like 3G, WI-FI or Bluetooth, or via an adapter that provides power to the truck tester as well as the appropriate interface. The microprocessor 1302 may be programmed to recognize the connection and then initiate and carryout such communications with a centralized operations facility. The wireless Internet connection may be part of the tester rather than a separate component and the device may maintain a continuous connection to the Internet. Further, the tester may wirelessly communicate directly with the controller 108 or with any controller 108 when it detects coming into proximity of the controller.

One embodiment of the present invention has been described where a buzzer is used to notify the user of an event, for example, completion of testing. It is envisioned that the buzzer would emit a tone or sound that would draw the attention of the user. Alternately, a speaker may be implemented, along with a speech synthesis chip controlled by the microprocessor, to provide an audible message for the user to comprehend.

Still further, the tester may be provided with a Global Positioning System (GPS) device that can monitor and/or report on the location of the tester or provide a history of where it has been. The location information may be used in conjunction with any licensing program that is implemented and which may have geographic limitations or constraints.

While one embodiment of the present invention was described as a unitary hand-held system, the invention is not limited only to such a construction. Other housings may be used to contain the circuitry described above. Further, a cable with a connector or plug that implements the contact block and pins as described above is also part of this disclosure.

It should be understood that the invention is not limited in its application to the details of construction and the arrangement of the components set forth in the description or illustrated in the drawings. The invention is capable of other embodiments or of being practiced or carried out in various ways. Also, it should be understood that the phraseology and terminology employed herein are for the purpose of description and should not be regarded as limiting. Certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, some methods of the present invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only.

What is claimed is:

1. A portable device for determining a status of a tanker truck safety system, the device comprising:
a microprocessor configured to run a program to determine the status of a tanker truck safety system;
a plurality of spring-loaded pins configured to couple with corresponding contact pads on the truck safety system, the plurality of pins coupled to a plurality of inputs of the microprocessor;
a first intrinsically safe power supply controlled by the microprocessor and coupled to a first subset of the plurality of spring-loaded pins and configured to provide a first intrinsically safe voltage to each pin individually under control of the microprocessor; and
a second intrinsically safe power supply controlled by the microprocessor and coupled to a spring-loaded pin not in the first subset of pins and configured to provide a second intrinsically safe voltage to the one pin under control of the microprocessor, wherein the first and second intrinsically safe voltages are on separate rails.

2. The portable device of claim 1, further comprising:
a raw voltage source to provide a raw voltage to each of the first and second intrinsically safe power supplies,
wherein the first and second intrinsically safe voltages are generated from the raw voltage.

3. The portable device of claim 1, further comprising:
a ground verification module controlled by the microprocessor and coupled to a pin of the plurality of pins.

4. The portable device of claim 1, further comprising:
an intrinsically safe interface coupled between the plurality of pins and the plurality of inputs on the microprocessor.

5. The portable device of claim 1, wherein each spring-loaded pin comprises a spring disposed about the pin,
wherein an electrical signal sent to or received from the tanker truck safety system is conducted along the spring.

6. The portable device of claim 1, further comprising:
a magnetic proximity switch;
a main power supply having an output coupled to the microprocessor, the main power supply also coupled to the magnetic proximity switch; and
a magnet disposed on a proximal end of one pin of the plurality of spring-loaded pins, such that movement of the pin causes a magnet to be closer to or farther away from the switch,
wherein movement of the magnet closer to the magnetic proximity switch turns on the main power supply.

7. The portable device of claim 6, wherein:
the microprocessor is configured to cause the main power supply to remain on for a predetermined time even after the magnet is positioned farther from the switch after having been positioned closer.

8. The portable device of claim 1, wherein at least one of the contact pads is coupled to at least one sensor of the tanker truck safety system and wherein:
the microprocessor is configured to test each at least one sensor.

9. The portable device of claim 8, wherein the microprocessor is further configured to test each at least one sensor one after another in series.

10. The portable device of claim 8, further comprising:
a memory coupled to the microprocessor,
wherein the microprocessor is further configured to store information regarding the status of the tanker truck safety system in the memory upon completion of the program.

11. The portable device of claim 10, wherein the stored status information comprises results of the tests of each at least one sensor.

12. The portable device of claim 10, wherein the microprocessor is further configured to transmit the stored status information to a central system.

13. The portable device of claim 1, provided within a generally cylindrical handheld housing having a circumferential portion defined about an opening at a first end thereof, the handheld housing comprising:
a first pin extending radially into the opening and located at a first position about the circumferential portion;
a first through hole radially oriented with respect to the opening and at a second circumferential position that is at a predetermined relationship to the first position;
a second through hole radially oriented with respect to the opening and at a third circumferential position that is at a predetermined relationship to the first and second positions; and
a first movably positionable pin located in, and extending radially into, the opening from only one of the second and third through holes.

14. The portable device of claim 13, wherein the handheld housing further comprises:
a second movably positionable pin located in and not extending radially into the opening from the other of the second and third through holes.

15. The portable device of claim 13, wherein the first movably positionable pin is spring-loaded.

16. The portable device of claim 13, wherein the first movably positionable pin is a screw and the first and second through holes are correspondingly threaded.

17. The portable device of claim 13, wherein the first pin is one of: fixed, threaded and spring-loaded.

18. The portable device of claim 1, provided within a generally cylindrical handheld housing and further comprising:
a display provided in the handheld housing and coupled to the microprocessor,
wherein the display indicates the status of the truck safety system.

19. The portable device of claim 18, wherein the display comprises at least one LED.

20. An adaptable connector comprising:
a generally cylindrical handheld housing having a circumferential portion defined about an opening at a first end thereof;
a first pin extending radially into the opening and located at a first position about the circumferential portion;
a first through hole radially oriented with respect to the opening and at a second circumferential position that is at a predetermined relationship to the first position;
a second through hole radially oriented with respect to the opening and at a third circumferential position that is at a predetermined relationship to the first and second positions; and
a first movably positionable pin located in and extending radially into the opening from only one of the second and third through holes.

21. The adaptable connector of claim 20, further comprising:
a second movably positionable pin located in and not extending radially into the opening from the other of the second and third through holes.

22. The adaptable connector of claim 20, wherein:
the first movably positionable pin is spring-loaded.

23. The adaptable connector of claim 20, wherein:
the first movably positionable pin is a screw and the first and second through holes are correspondingly threaded.

24. The adaptable connector of claim 20, wherein:
the first pin is one of: fixed, threaded and spring-loaded.

* * * * *